United States Patent
Sugisaka et al.

(10) Patent No.: US 12,115,950 B2
(45) Date of Patent: Oct. 15, 2024

(54) VEHICLE IMAGING APPARATUS

(71) Applicant: KABUSHIKI KAISHA TOKAI-RIKA-DENKI-SEISAKUSHO, Aichi (JP)

(72) Inventors: Kenichi Sugisaka, Aichi (JP); Masakazu Iwatsuki, Aichi (JP); Tomonori Ichikawa, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 107 days.

(21) Appl. No.: 17/797,134

(22) PCT Filed: Feb. 5, 2021

(86) PCT No.: PCT/JP2021/004348
§ 371 (c)(1),
(2) Date: Aug. 3, 2022

(87) PCT Pub. No.: WO2021/157700
PCT Pub. Date: Aug. 12, 2021

(65) Prior Publication Data
US 2023/0059260 A1    Feb. 23, 2023

(30) Foreign Application Priority Data
Feb. 7, 2020    (JP) .................. 2020-020131

(51) Int. Cl.
*B60S 1/60*    (2006.01)
*G03B 17/55*    (2021.01)

(52) U.S. Cl.
CPC .............. *B60S 1/60* (2013.01); *G03B 17/55* (2013.01)

(58) Field of Classification Search
CPC .......... B60S 1/60; G03B 17/55; G03B 30/00; H05B 1/0236; H05B 2203/011;
(Continued)

(56) References Cited

U.S. PATENT DOCUMENTS

| 2011/0181725 A1 | 7/2011 | Matsuura et al. |
| 2020/0247330 A1* | 8/2020 | Tokunaga ............. G03B 17/55 |
| 2022/0039216 A1* | 2/2022 | Hirata ....................... H05B 3/86 |

FOREIGN PATENT DOCUMENTS

| JP | 2000-108851 | 4/2000 |
| JP | 2011-155468 | 8/2011 |

(Continued)

OTHER PUBLICATIONS

PCT International Search Report (w/ English translation) and Written Opinion for corresponding PCT Application No. PCT/JP2021/004348, mailed on Mar. 16, 2021, 8 pages.

*Primary Examiner* — Michael E Teitelbaum
(74) *Attorney, Agent, or Firm* — Dority & Manning, P.A.

(57) ABSTRACT

A vehicle imaging apparatus includes an imaging device capable of imaging an imaging side thereof; a transparent heater that is provided at least in a range of an angle of view of the imaging device at the imaging side of the imaging device, that generates heat by being energized, and that heats an imaging side of the imaging device; and a resistance member that is provided at an electrical circuit including the heater, and that generates heat by being energized, an electrical resistance value of the resistance member is increased along with increase in temperature of the resistance member due to heat generation such that a current value of current that flows to the heater is decreased.

7 Claims, 8 Drawing Sheets

(58) Field of Classification Search
CPC ............... H05B 2203/013; H05B 3/84; G02B 27/0006; H04N 23/00
See application file for complete search history.

(56) References Cited

FOREIGN PATENT DOCUMENTS

| | | |
|---|---|---|
| JP | 2017-109683 | 6/2017 |
| JP | 2018-072484 | 5/2018 |
| WO | WO 2019/225745 | 11/2019 |
| WO | WO 2020/004351 | 1/2020 |

* cited by examiner

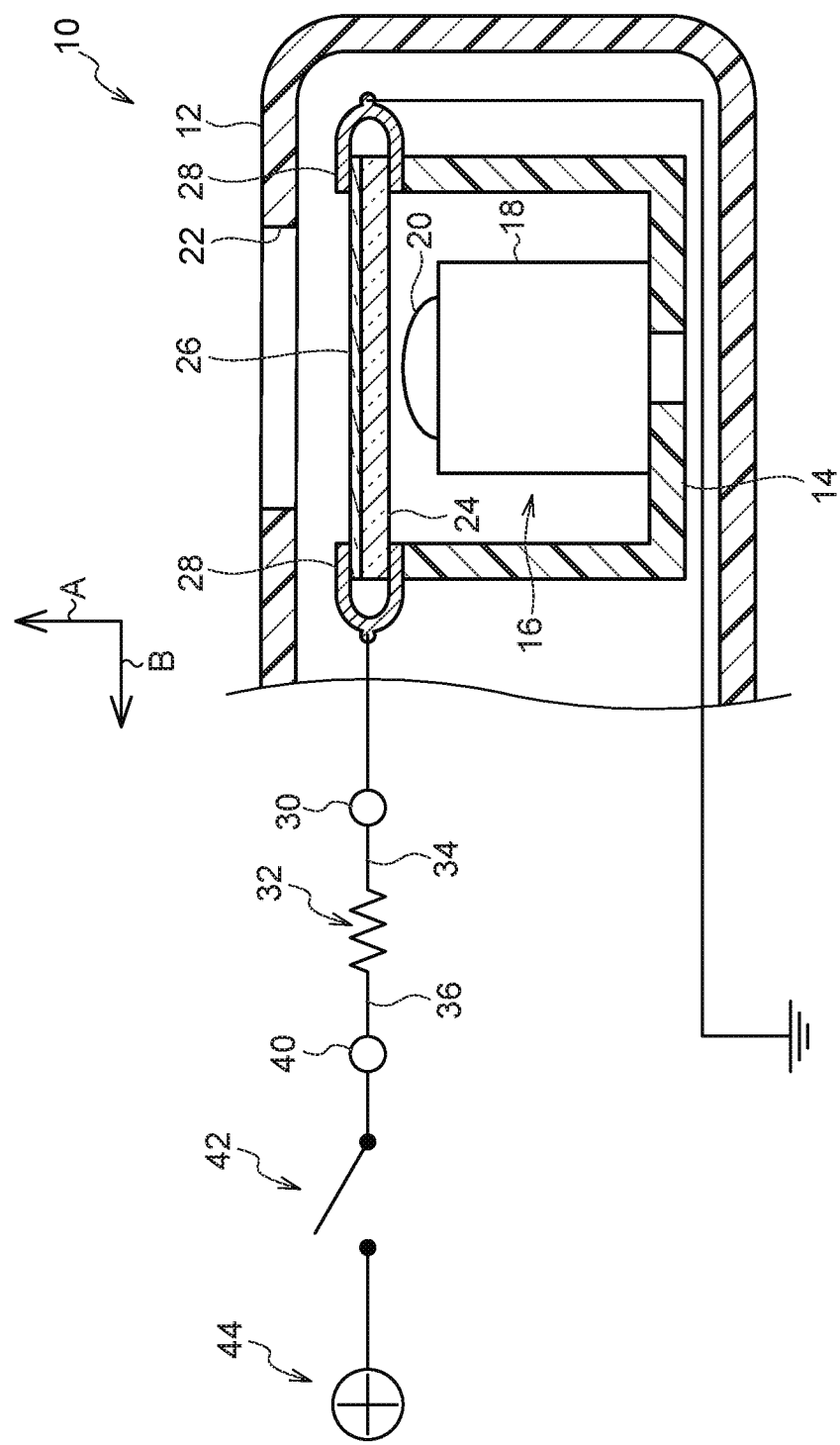

RELATIONSHIP BETWEEN TEMPERATURE AND
ELECTRICAL RESISTANCE VALUE OF
RESISTANCE MEMBER 32

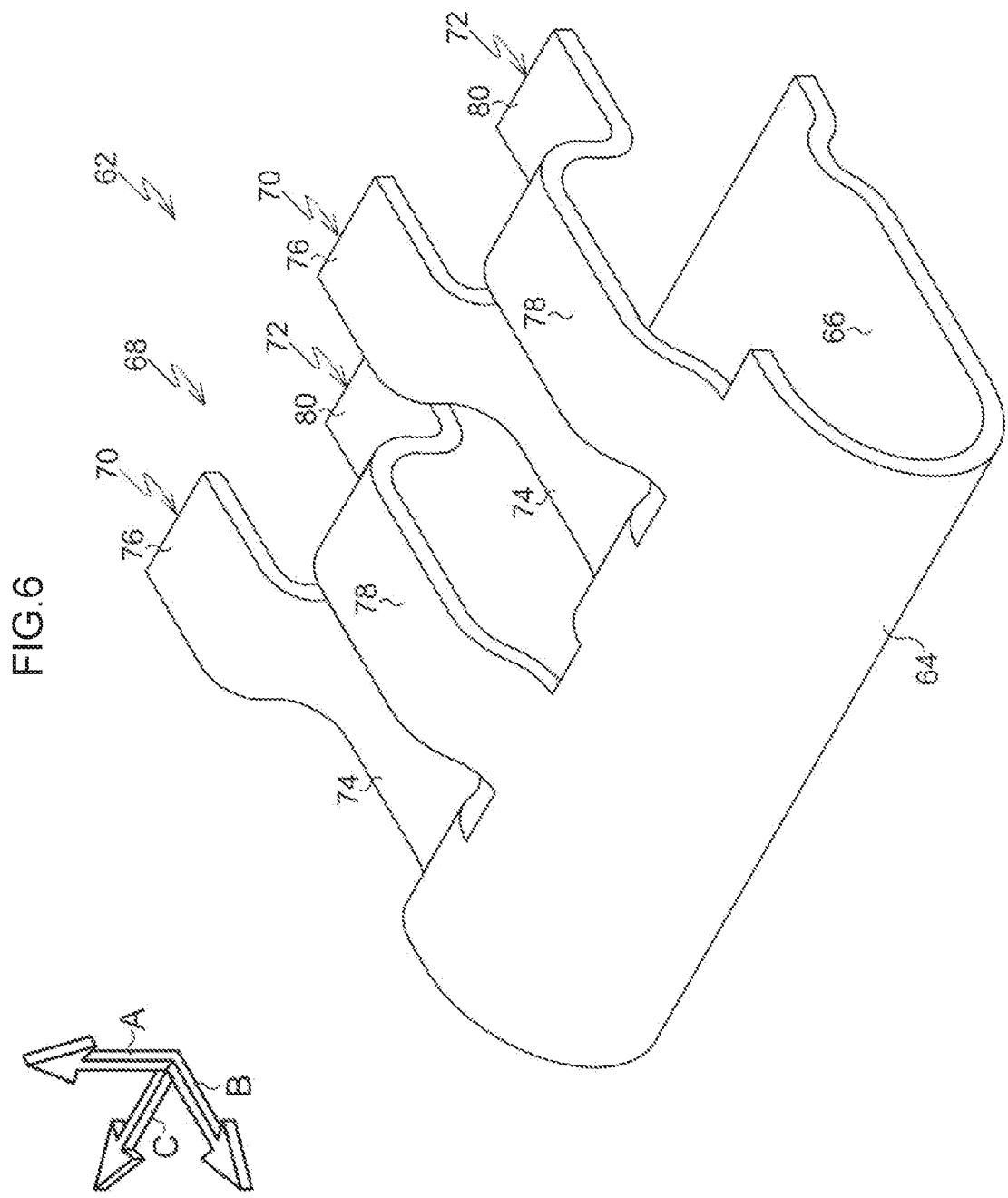

VEHICLE IMAGING APPARATUS

CROSS-REFERENCE TO RELATED APPLICATIONS

The present application is related and has right of priority to JP 2020-020131, which was filed on Feb. 7, 2020 in the Japanese Patent Office, and is a U.S. national phase entry of PCT/JP2021/004348, which was filed on Feb. 5, 2021, both of which are incorporated by reference in their entireties for all purposes.

TECHNICAL FIELD

The present invention relates to a vehicle imaging apparatus that performs imaging by an imaging device.

BACKGROUND ART

There is a configuration in which a reflecting film of a mirror body such as a door mirror of a vehicle is heated by a film-like heater, fogging and frost adhering to the surface of the reflecting film is removed, and water droplets such as raindrops adhering to the surface of the reflecting film are evaporated and removed. In such configuration, the temperature of the heater is detected by a temperature sensor, and the energizing current to the heater is controlled based on the temperature of the heater (see, for example, Japanese Patent Application Laid-Open (JP-A) No. 2000-108851).

In such configuration, it is conceivable to use a so-called negative temperature coefficient (NTC) thermistor as a temperature sensor. However, the electrical resistance value of the NTC thermistor decreases with increase in temperature. Therefore, at the time of start of application of voltage to an electrical circuit including a heater and an NTC thermistor, the electrical resistance value of the NTC thermistor is large, and current having a large current value does not flow through the heater. For this reason, temperature increase of the heater is slow.

SUMMARY OF INVENTION

Technical Problem

In consideration of the above circumstances, the invention provides a vehicle imaging apparatus capable of quickening a temperature increase of a heater.

Solution to Problem

A vehicle imaging apparatus of a first aspect of the invention includes: an imaging device capable of imaging an imaging side thereof; a transparent heater provided at least in a range of an angle of view of the imaging device at the imaging side of the imaging device, generating heat by being energized, and heating the imaging side of the imaging device; and a resistance member provided at an electrical circuit that includes the heater, and generating heat by being energized, an electrical resistance value of the resistance member being increased along with increase in temperature of the resistance member due to heat generation such that a current value of current that flows to the heater is decreased.

According to the vehicle imaging apparatus in the first aspect of the invention, the imaging side of the imaging device is provided with the transparent heater. The heater generates heat by being energized. In a case in which frost or water droplets are generated on the imaging side of the imaging device, the heater generates heat, whereby the frost or water droplets can be evaporated and removed.

The electrical circuit including the heater is provided with a resistance member. The resistance member generates heat by being energized. When the resistance member generates heat, the electrical resistance value increases along with increase in the temperature of the resistance member. When the electrical resistance value of the resistance member increases, the current value of the current flowing through the heater decreases. This suppresses heat generation of the heater.

The electrical resistance value of the resistance member increases along with increase in the temperature of the resistance member. The electrical resistance value of the resistance member is small at the time of start of application of voltage to the electrical circuit including the resistance member and the heater, that is, when temperature increase of the resistance member begins. It is possible to flow current having a large current value through the electrical circuit including the resistance member and the heater at the time of start of application of voltage to the electrical circuit. This makes it possible to increase the temperature of the heater in a short time.

A vehicle imaging apparatus of a second aspect of the invention is the vehicle imaging apparatus of the first aspect, in which the imaging device includes an imaging device main body provided with a lens on an imaging side, and a transparent plate provided on the imaging side of the imaging device main body. The heater is provided on the imaging side or on a side opposite from the imaging side at at least one of the plate and the lens.

In the vehicle imaging apparatus of the second aspect of the invention, the heater is provided at the imaging side or the side opposite from the imaging side at at least one of the lens of the imaging device main body and the transparent plate provided at the imaging side of the imaging device main body. Due to this, frost, water droplets, and the like adhering to a side of the lens of the imaging device main body or the plate provided, which is close to the heater, can be evaporated and removed by the heat of the heater.

A vehicle imaging apparatus of a third aspect of the invention is the vehicle imaging apparatus of the first aspect or the second aspect in which, in a state in which the resistance member is at a specific temperature, a temperature of the heater is lower than the specific temperature.

In the vehicle imaging apparatus of the third aspect of the invention, in a state in which the resistance member is at a specific temperature, the temperature of the heater is lower than the specific temperature. It is possible to suppress the temperature of the resistance member from increasing due to the heat of the heater.

A vehicle imaging apparatus of a fourth aspect of the invention is the vehicle imaging apparatus of any one of the first aspect to the third aspect, in which increase in the electrical resistance value of the resistance member in accompanying a temperature increase of the resistance member is larger at a predetermined temperature or higher, than at a temperature lower than the predetermined temperature.

According to the vehicle imaging apparatus of the fourth aspect of the invention, increase in the electrical resistance value of the resistance member in accompanying a temperature increase of the resistance member is larger at a predetermined temperature or higher than at a temperature lower than the predetermined temperature. When temperature of the resistance member exceeds the predetermined temperature, the current value of the current flowing through the heater can be effectively reduced, and temperature increase of the heater can be effectively suppressed.

A vehicle imaging apparatus of a fifth aspect of the invention is the vehicle imaging apparatus of any one of the first aspect to the fourth aspect, further including a heat transfer suppression unit that suppresses heat from an exterior of the resistance member from transferring to the resistance member.

In the vehicle imaging apparatus in the fifth aspect of the invention, heat from the exterior of the resistance member is suppressed from transferring to the resistance member by the heat transfer suppression unit. This makes it possible to suppress an influence of a temperature increase to the resistance member due to a heat source such as the heater.

A vehicle imaging apparatus of a sixth aspect of the invention is the vehicle imaging apparatus of the fifth aspect, in which the heat transfer suppression unit has the resistance member arranged at an inner side of the heat transfer suppression unit and covers the resistance member.

In the vehicle imaging apparatus in the sixth aspect of the invention, the resistance member is arranged at an inner side of the heat transfer suppression unit, and the resistance member is covered by the heat transfer suppression unit. Due to this, the heat transfer suppression unit can suppress heat from the exterior of the heat transfer suppression unit from transferring to the resistance member.

Advantageous Effects of Invention

As described above, the vehicle imaging apparatus according to each aspect of the invention is capable of enhancing a temperature increase of a heater.

BRIEF DESCRIPTION OF DRAWINGS

FIG. 1 is a composite diagram of a cross-sectional view showing a configuration of a main part of a vehicle imaging apparatus and a schematic circuit diagram of an electrical circuit including a heater and a resistance member according to a first embodiment.

FIG. 6 is a perspective view of a bus bar in the third embodiment.

DESCRIPTION OF EMBODIMENTS

Figure 2A:
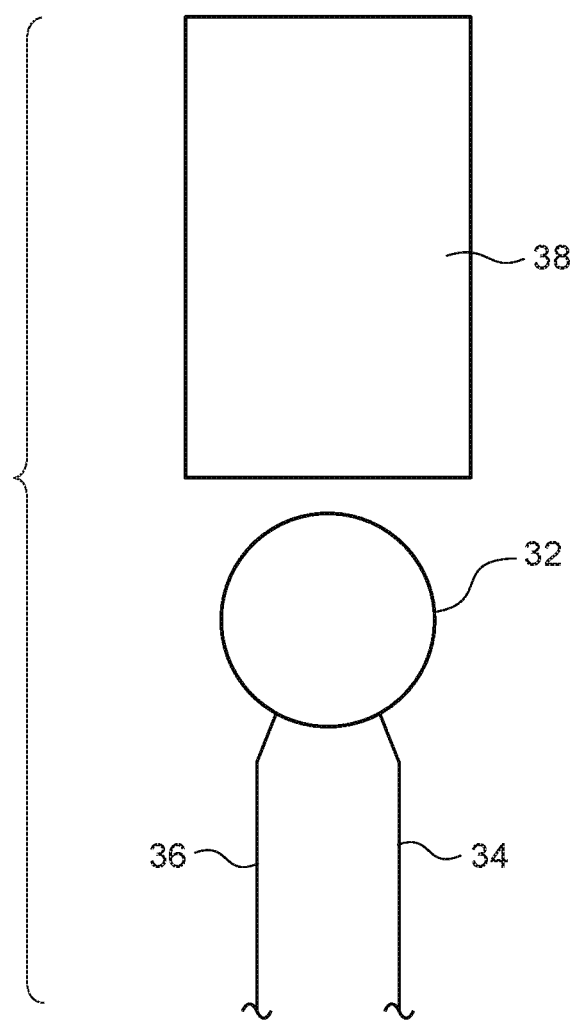
FIG. 2A is a schematic view showing a resistance member and a tube, and shows a state before the tube is attached to the resistance member.

Embodiments of the invention will be described with reference to FIGS. 1 to 6. Note that an arrow An appropriately shown in each drawing indicates an opening direction side of a camera bracket 14 described later, an arrow B indicates one side in a direction orthogonal to the arrow A direction, and an arrow C indicates one side in a direction orthogonal to both the arrow A direction and the arrow B direction. In the following description of each embodiment, same reference signs are given to same configurations as those of embodiments described before the embodiment for which the description is made, and detailed description thereof will be omitted.

Configuration of First Embodiment

As shown in FIG. 1, a vehicle imaging apparatus 10 according to the first embodiment includes a housing 12. The housing 12 is provided at an outer side of a front end of a vehicle side door panel corresponding to a front seat of the vehicle, for example. The housing 12 is attached to the vehicle body via a coupling bracket (not shown). The coupling bracket is rotatable with respect to the vehicle body between a stored state and a usable state.

Inside of the housing 12 is provided with a camera bracket 14. The camera bracket 14 has a substantially box shape, and is opened toward the vehicle rear side in the usable state. Inside of the camera bracket 14 is provided with a camera 16 as an imaging device main body that configures an imaging device. The camera 16 includes a camera main body 18 and a lens 20, and the lens 20 is provided at an opening side (arrow A direction side in FIG. 1) at the camera main body 18 in the camera bracket 14.

The housing 12 is provided with an opening part 22. The opening part 22 penetrates an inner side and an outer side of the housing 12 and is provided at the opening side of the camera bracket 14. Due to this, the camera 16 can image the opening side of the camera bracket 14 at an outer side of the housing 12, that is, the vehicle rear side of the outer side of the housing 12 in the usable state.

Inside of the camera main body 18 is provided with a circuit board (not shown), and the electrical circuit on the circuit board is electrically connected with an imaging element and the like. The electrical circuit on the circuit board is electrically connected to a monitor (not shown) provided on an instrument panel (not shown) in the vehicle interior, for example, and an image captured by the camera 16 is displayed on the monitor. The occupant seated in the driver's seat of the vehicle can check the situation on the vehicle rear side of the vehicle exterior by viewing the monitor.

As shown in FIG. 1, the opening side (arrow A direction side in FIG. 1) of the camera bracket 14 inside the housing 12 is provided with a plate 24 configuring the imaging device together with the camera 16. The plate 24 is made of, for example, glass or the like, and is transparent. The plate 24 has a rectangular plate shape, and opposes the lens 20 of the camera 16 at the opening direction side of the camera bracket 14. The thickness direction of the plate 24 is along the opening direction and an opposite direction of the opening direction of the camera bracket 14, and the outer peripheral shape of the plate 24 is the same shape as or a similar shape to the outer peripheral shape of the camera bracket 14, for example.

A side opposite from the opening side of the camera bracket 14 with respect to the plate 24 is provided with a heater 26. The heater 26 has a plate shape, a sheet shape, or a film shape, and the outer peripheral shape of the heater 26 is a substantially rectangular shape that is the same as the outer peripheral shape of the plate 24 or larger than the outer peripheral shape of the plate 24. The thickness direction of the heater 26 is along the opening direction and the opposite direction of the opening direction of the camera bracket 14. The heater 26 is made of indium tin oxide (ITO), for example. The heater 26 has conductivity and is transparent. The heater 26 and the plate 24 that include the range of an angle of a view of the camera 16 overlap in thickness directions to each other.

The heater 26 and the plate 24 are provided with a pair of bus bars 28. These bus bars 28 are made of metal or the like and have conductivity. One of the pair of bus bars 28 is provided on one side (arrow B direction side in FIG. 1) of the heater 26 and the plate 24 in a direction orthogonal to the opening direction of the camera bracket 14. The other of the pair of bus bars 28 is provided on the other side (opposite direction side to the arrow B direction in FIG. 1) of the heater 26 and the plate 24 in the direction orthogonal to the opening direction of the camera bracket 14. That is, the both bus bars 28 are arranged to oppose each other in the direction orthogonal to the opening direction of the camera bracket 14 (arrow B direction side and the opposite direction side in FIG. 1). The both bus bars 28 are opened so as to oppose to each other.

Each of the bus bars 28 is elastically deformable so as to increase opening dimension of the opening end against an elastic force of the bus bar 28 of its own. End parts at one side (arrow B direction side in FIG. 1) in the direction orthogonal to the opening direction of the heater 26 and the plate 24 are sandwiched and held by one of the bus bars 28. End parts on the other side (the side opposite from the arrow B direction side in FIG. 1) in the direction orthogonal to the opening direction of the heater 26 and the plate 24 are sandwiched and held by the other of the bus bars 28.

The other of the bus bars 28 is grounded (earthed). The one of the bus bars 28 is connected to a first connector 30. The first connector 30 is formed by a male connector and a female connector, and the male connector and the female connector are mechanically and electrically connected by inserting the male connector to an inner side of the female connector from an opening side of the female connector. The one of the bus bars 28 is electrically connected to one of the male connector and the female connector of the first connector 30.

The other of the male connector and the female connector of the first connector 30 is electrically connected to a terminal 34 of a pair of terminals 34 and 36 of a resistance member 32. As shown in FIG. 2A, the resistance member 32 is provided with a tube 38 as a covering member that configures a heat transfer suppression unit. The tube 38 is formed in a tubular shape, and the both ends in a length direction of the tube 38 are opened.

Figure 2B:
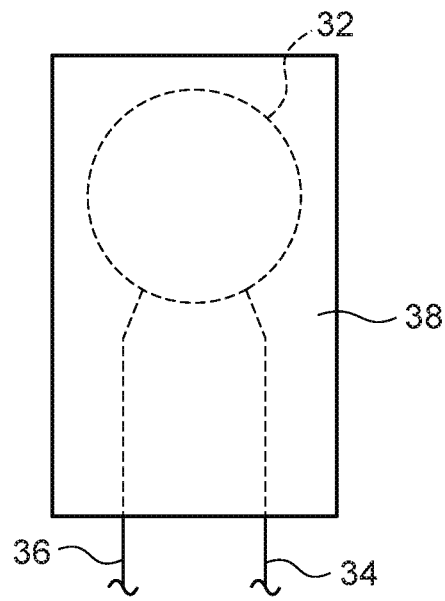
FIG. 2B is a schematic view showing the resistance member and the tube, and shows a state in which the resistance member is arranged at an inner side of the tube.
Figure 2C:
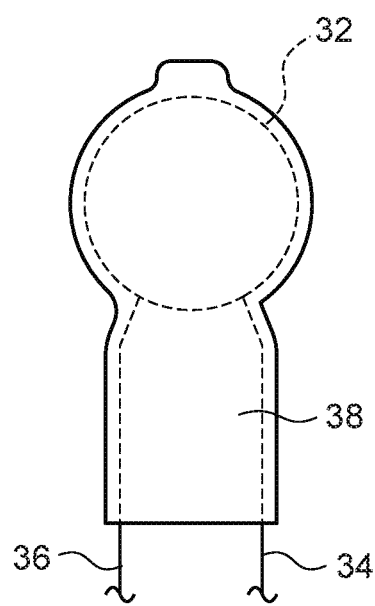
FIG. 2C is a schematic view showing the resistance member and the tube, and shows a state in which the tube is heated and shrunk.

The resistance member 32 is arranged at an inner side of the tube 38 from one of the opening ends of the tube 38 (state shown in FIG. 2B). The tube 38 has a property of being shrunk when heated, for example, and when the tube 38 is heated in a state in which the resistance member 32 is arranged at an inner side of the tube 38, the tube 38 is deformed into a shape fitting to the resistance member 32 (state shown in FIG. 2C). Thus, the resistance member 32 is covered with the tube 38, whereby it is possible to reduce the influence of heat received by the resistance member 32 from the exterior of the tube 38.

As shown in FIG. 1, the other terminal 36 of the resistance member 32 is connected to a second connector 40. The second connector 40 is formed by a male connector and a female connector, and the male connector and the female connector are mechanically and electrically connected by inserting the male connector to the inner side of the female connector from the opening side of the female connector. The other terminal of the resistance member 32 is electrically connected to one of the male connector and the female connector of the second connector 40.

The other of the male connector and the female connector of the second connector 40 is electrically connected to one of a pair of terminals of a switch 42, and the other terminal of the switch 42 is electrically connected to a positive terminal of a battery 44 mounted on the vehicle. The switch 42 can be operated to open and close electrically or mechanically by an operation member (not shown) provided near the driver's seat in the vehicle interior. When the switch 42 is closed, the heater 26 is energized via the resistance member 32. Thus, when the heater 26 is energized, the heater 26 generates heat, and for example, frost, water droplets, and the like adhering to the plate 24 are heated and evaporated.

Figure 3:
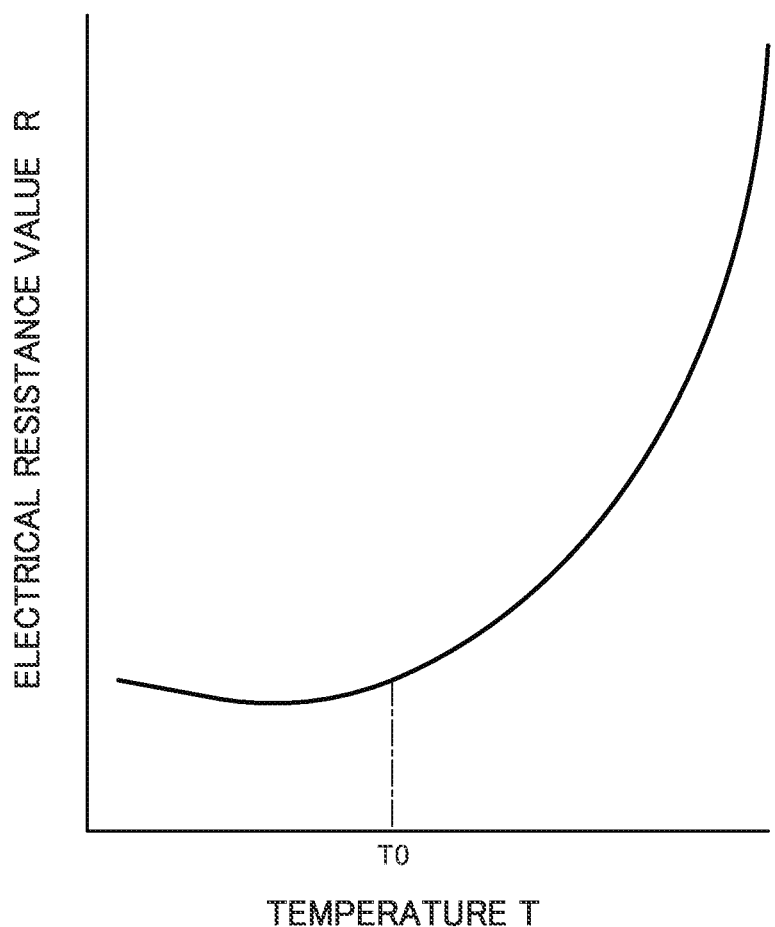
FIG. 3 is a graph showing a relationship between temperature of the resistance member and an electrical resistance value.

The resistance member 32 generates heat when energized. As shown in FIG. 3, in a case in which the temperature of the resistance member 32 increases to a predetermined temperature T0 (for example, the Curie temperature of the resistance member 32) or higher, an electrical resistance value of the resistance member 32 increases as compared with that in a case in which the temperature of the resistance member 32 is lower than the predetermined temperature T0. In a case in which the voltage applied to the electrical circuit including the resistance member 32 and the heater 26 by the battery 44 is constant, the resistance member 32 becomes at the predetermined temperature T0 or higher, and the electrical resistance value of the resistance member 32 increases, whereby the current value of the current flowing through the electrical circuit including the resistance member 32 and the heater 26 decreases.

The temperature of the resistance member 32 increases by being energized. In a state in which a constant voltage is applied to the electrical circuit including the heater 26 and the resistance member 32, for example, when a temperature of the resistance member 32 exceeds at a specific temperature higher than the predetermined temperature T0, the temperature of the resistance member 32 becomes higher than the temperature of the heater 26. Such configuration of the resistance member 32 is similar to a so-called "PTC thermistor", for example, and the "PTC thermistor" can be used as the resistance member 32.

Functions and Effects of First Embodiment

In the present embodiment having the above configuration, for example, when moisture in the housing 12 increases, water droplets adhere to the plate 24 or the plate 24 is fogged. When the exterior temperature of the vehicle is low, frost may adhere to the plate 24. In such case, when an operation member in the vehicle interior is operated, a constant voltage is applied to the electrical circuit including the heater 26, and the electrical circuit is energized, the heater 26 generates heat by the electrical resistance of the heater 26 of its own.

When the temperature of the heater 26 increases due to such heat generation of the heater 26, the heat of the heater 26 is transferred to the plate 24, and the temperature of the plate 24 increases. When the temperature of the plate 24 increases in this manner, water droplets and frost adhering to the plate 24 are evaporated, or fogging of the plate 24 is removed. This enables the camera 16 to image the situation on the vehicle rear side clearly as compared with before removal of water droplets, frost, and the like.

When a constant voltage is applied to the electrical circuit including the heater 26, the electrical circuit is energized, and a current flows through the resistance member 32. When a current flows through the resistance member 32 in this manner, the resistance member 32 generates heat, and the temperature of the resistance member 32 increases. When the temperature of the resistance member 32 exceeds the predetermined temperature T0, the electrical resistance value of the resistance member 32 increases.

In the event that the battery 44 applies a constant voltage to the electrical circuit including the heater 26 and the resistance member 32, the current value of the current flowing through the resistance member 32 and the heater 26 decreases in accordance with the increase in electrical resistance value of the resistance member 32. When the temperature of the resistance member 32 increases to a temperature sufficiently higher than the predetermined temperature T0, the current value of the current flowing through the heater 26 becomes sufficiently small, and the temperature increase of the heater 26 is effectively suppressed.

In the present embodiment, a constant voltage is applied to the heater 26 by the battery 44. Therefore, by applying, to the heater 26, the maximum voltage allowed by the electrical circuit including the heater 26 and the resistance member 32, it is possible to increase the temperature of the heater 26 quickly, and it is possible to remove water droplets and frost adhering to the plate 24 or fogging of the plate 24 in a short time.

Moreover, the heater 26 has a plate shape, a sheet shape, or a film shape, and the outer peripheral shape of the heater 26 is the same as the outer peripheral shape of the plate 24 or larger than the outer peripheral shape of the plate 24. The heater 26 can heat the entire plate 24, and accordingly can quickly increase the temperature on a central area of the plate 24 in the direction orthogonal to the thickness direction of the plate 24, for example, and can remove water droplets and frost adhering to the central area of the plate 24 or fogging of the plate 24 in a short time.

Moreover, the electrical resistance value of the resistance member 32 increases as current flows through the resistance member 32 and the temperature of the resistance member 32 increases. That is, at the time of start of application of voltage to an electrical circuit including the resistance member 32 and the heater 26, the temperature of the resistance member 32 is low, and the electrical resistance value of the resistance member 32 is low. If the application of the voltage to the electrical circuit is constant, current having a large current value can flow through the heater 26. The temperature of the heater 26 can increase in a short time.

For example, in a configuration in which the temperature of the heater 26 is detected by a temperature sensor or the like and energization to the heater 26 is stopped when the temperature of the heater 26 becomes equal to or higher than a certain temperature, it is difficult to accurately detect the temperature of the heater 26 in the event that the temperature sensor is disposed away from the heater. In such configuration, the temperature sensor is arranged extremely near the heater 26.

The present embodiment has a configuration in which the temperature increase of the heater 26 is suppressed by increasing the temperature of the resistance member 32 to a temperature sufficiently higher than the predetermined temperature T0, and does not have a configuration in which the resistance member 32 directly detects the temperature of the heater 26. Accordingly, the arrangement position of the resistance member 32 is not required to be close to the heater 26 in particular.

Moreover, in a state where a constant voltage is applied to the electrical circuit including the heater 26 and the resistance member 32, for example, when the resistance member 32 exceeds a specific temperature that is higher than the predetermined temperature T0, the temperature of the resistance member 32 becomes higher than the temperature of the heater 26. When the resistance member 32 exceeds the specific temperature that is higher than the predetermined temperature T0, it is possible to suppress the resistance member 32 from being heated by the heat of the heater 26.

The resistance member 32 is covered with the tube 38, and the resistance member 32 can be suppressed from being heated by heat at an exterior of the tube 38. This makes it possible to suppress the resistance member 32 from being heated by the heat of the heater 26. Thus, since the temperature of the resistance member 32 can be suppressed from increasing by the heat of the heater 26, the resistance member 32 can be arranged near the heater 26.

Thus, in the present embodiment, an excessive temperature increase of the heater 26 can be suppressed regardless of the arrangement position of the resistance member 32. The flexibility in setting of the arrangement position of the resistance member 32 is high.

The resistance member 32 and the heater 26 are electrically and mechanically connected by the first connector 30, and the resistance member 32 and the switch 42 are electrically and mechanically connected by the second connector 40. Therefore, even if a resistance member 32 has different electrical resistance value increase characteristics with respect to a temperature, such a resistance member 32 can be connected to each of the heater 26 and the switch 42, if the resistance member 32 has a configuration in which a heater 26 side of the resistance member 32 is provided with the first connector 30 and a switch 42 side of the resistance member 32 is provided with the second connector 40. It is easy to change the specifications to the resistance member 32 having different electrical resistance value increase characteristics with respect to a temperature.

Second Embodiment

Figure 4A:
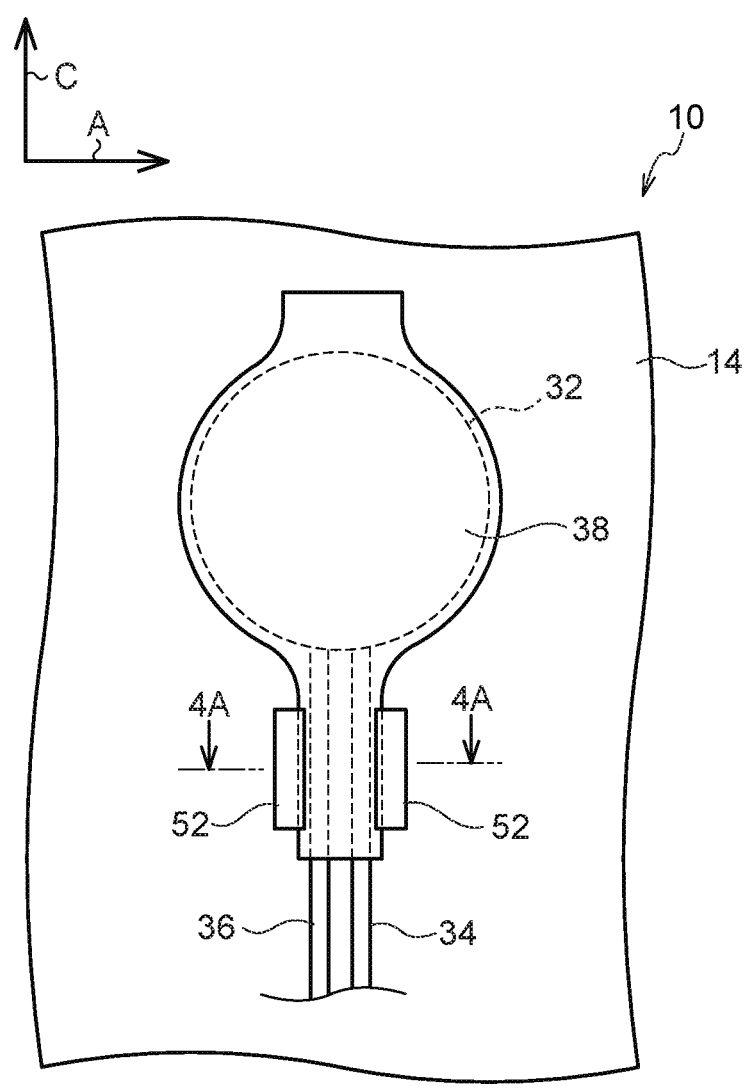
FIG. 4A is a schematic view showing a configuration of a main part of a vehicle imaging apparatus according to a second embodiment when viewed from one side in a direction orthogonal to an opening direction of a camera bracket.
Figure 4B:
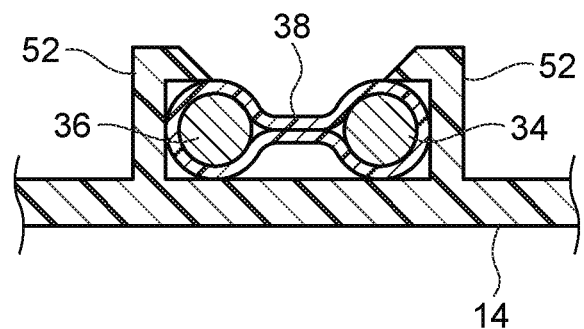
FIG. 4B is a cross-sectional view taken along line 4A-4A of FIG. 4A.

As shown in FIG. 4A, in the present embodiment, an outer surface of the camera bracket 14 that is disposed orthogonal to the opening direction of the camera bracket 14 is provided with a pair of holding pieces 52. The holding pieces 52 are formed to protrude from a wall of the camera bracket 14, and oppose to each other in the opening direction side and the opposite direction side to the opening direction side (arrow A direction side and the opposite direction side in FIG. 4) of the camera bracket 14.

Part of the tube 38 in which the terminals 34 and 36 of the resistance member 32 are covered, that is, parts of the tube 38 near the resistance member 32 are arranged between these holding pieces 52. The tube 38 is deformed by the holding pieces 52 in an opposing direction of the both holding pieces 52, whereby the tube 38 is held by the both holding pieces 52.

Thus, since the part of the tube 38 near the resistance member 32 is held by the both holding pieces 52, the resistance member 32 can be suppressed from inadvertently moving due to vibration at the time of traveling of the vehicle or the like. This makes it possible to suppress occurrence of a defect caused by inadvertent motion of the resistance member 32.

The present embodiment has a configuration in which the holding pieces 52 are formed at the camera bracket 14. However, the holding pieces 52 may be formed at the housing 12. That is, the holding pieces 52 may be provided near the arrangement position of the resistance member 32, and the arrangement position of the holding pieces 52 is not particularly limited.

Third Embodiment

Figure 5:
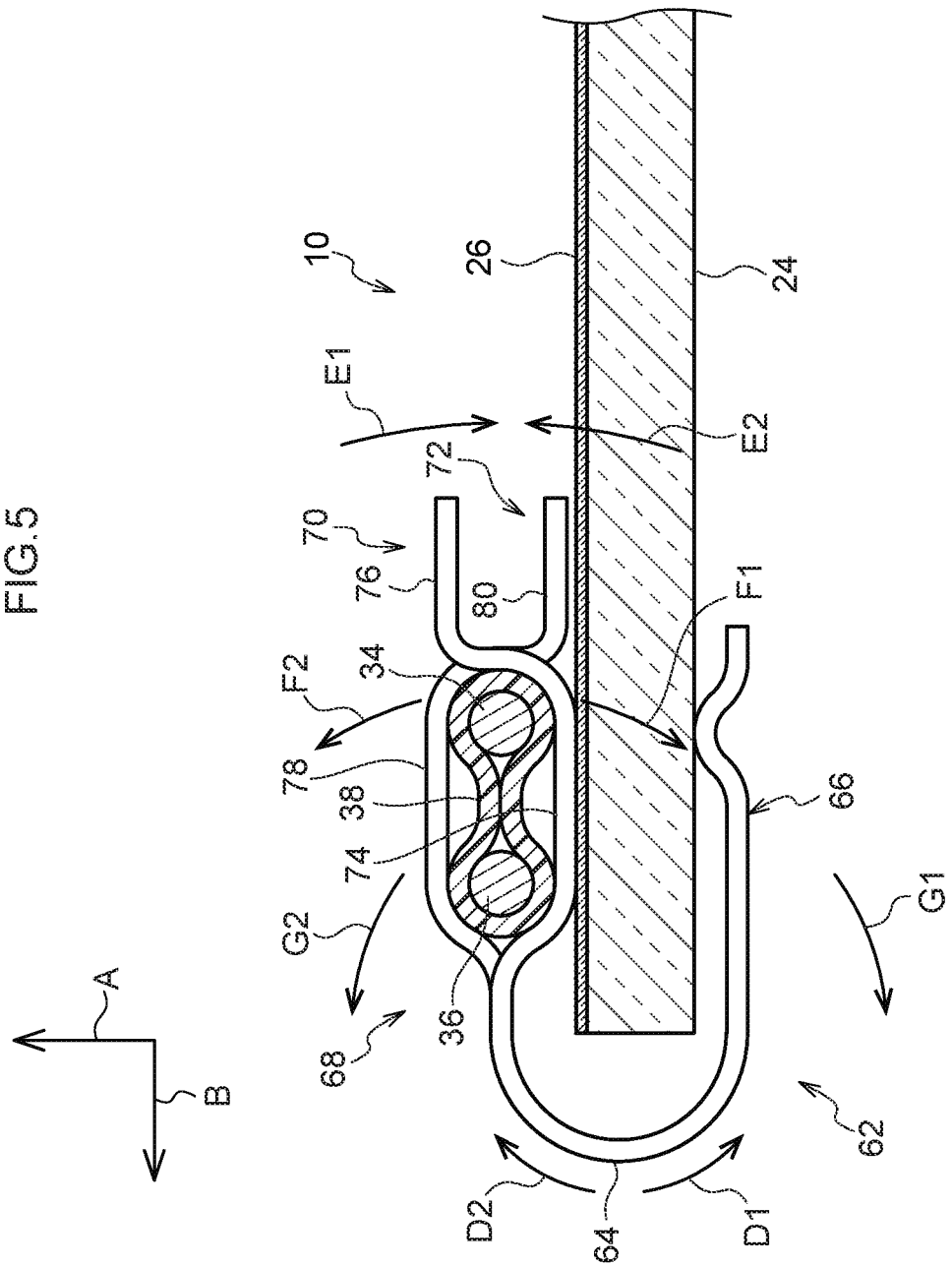
FIG. 5 is a cross-sectional view showing a configuration of a main part of a vehicle imaging apparatus according to a third embodiment.

As shown in FIG. 5, in a vehicle imaging apparatus 10 of the present embodiment, the heater 26 is arranged on the plate 24 at the opening direction side (arrow A direction side in FIG. 5) of the camera bracket 14 (not shown in FIG. 5). A bus bar 62 that is an alternative to the bus bar 28 of the pair of bus bars 28 that is not grounded (earthed) is included.

As shown in FIG. 5, the bus bar 62 is made of a plate material such as a metal plate having conductivity as a whole and having elasticity in a direction intersecting the thickness direction. The bus bar 62 includes a curved part 64. The curved part 64 is curved so as to open toward a direction orthogonal to the opening direction of the camera bracket 14.

One side (arrow D1 direction side in FIG. 5) of the bus bar 62 relative to the curved part 64 is a first pressure contact part 66. In a state in which the bus bar 62 is attached to the plate 24 and the heater 26, the first pressure contact part 66 is arranged at the plate 24 on the opposite side (side opposite from the arrow A direction in FIG. 5) to the opening direction of the camera bracket 14 (not shown in FIG. 5). The other side (arrow D2 direction side in FIG. 5) of the bus bar 62 relative to the curved part 64 is a second pressure contact part 68. In a state in which the bus bar 62 is attached to the plate 24 and the heater 26, the second pressure contact part 68 is arranged on the heater 26 at the opening direction side of the camera bracket 14 (not shown in FIG. 5).

The second pressure contact part 68 includes a plurality of first terminal holding pieces 70 and a plurality of second terminal holding pieces 72. As shown in FIG. 6, the first terminal holding piece 70 and the second terminal holding piece 72 are alternately provided along a central axis direction of a curvature of the curved part 64 (arrow C direction in FIG. 6).

The first terminal holding piece 70 includes a first terminal holding part 74. The first terminal holding part 74 extends from the other end of the curved part 64 of the bus bar 62. The first terminal holding part 74 is appropriately bent in a direction around an axis whose axial direction is the same direction as the central axis direction of the curvature of the curved part 64. The shape of the first terminal holding part 74 as viewed in the central axis direction of the curvature of the curved part 64 (that is, the shape of the first terminal holding part 74 in the state shown in FIG. 5) is generally a concave shape in which the opening direction (arrow A direction side in FIGS. 5 and 6) side of the camera bracket 14 is opened. From the end part of the first terminal holding part 74 opposite from the curved part 64, a first end 76 extends.

The second terminal holding piece 72 includes a second terminal holding part 78. The second terminal holding part 78 extends from the other end of the curved part 64 of the bus bar 62. The second terminal holding part 78 is appropriately bent in a direction around an axis whose axial direction is the same direction as the central axis direction of the curvature of the curved part 64.

Due to this, the shape of the second terminal holding part 78 as viewed in the central axis direction of the curvature of the curved part 64 (that is, the shape of the second terminal holding part 78 in the state shown in FIG. 5) is generally a concave shape in which an opposite direction (opposite direction to the arrow A in FIGS. 5 and 6) side to the opening direction of the camera bracket 14 is opened. An extension direction intermediate part from the curved part 64 of the second terminal holding part 78 is arranged at the opening direction side of the camera bracket 14 relative to the first terminal holding part 74 of the first terminal holding piece 70. In the opening direction of the camera bracket 14, a part of the tube 38 covering the both terminals 34 and 36 is arranged between the first terminal holding part 74 and the second terminal holding part 78.

An interval in the opening direction of the camera bracket 14 between the first terminal holding part 74 and the second terminal holding part 78 at the extension direction intermediate part from the curved part 64 in both the first terminal holding part 74 and the second terminal holding part 78 is equal to or less than a dimension along the opening direction at a part covering the both terminals 34 and 36 in the tube 38. In a state in which no external force is applied to the first pressure contact part 66 and the second pressure contact part 68, that is, in a state where the bus bar 62 is not attached to the plate 24 and the heater 26, the interval between the first pressure contact part 66 and the second terminal holding part 78 is less than the sum of the thickness of the plate 24 and the thickness of the heater 26.

From the end part of the second terminal holding part 78 opposite from the curved part 64, a second end 80 extends. The second end 80 is arranged on the opening direction (arrow A direction in FIGS. 5 and 6) side relative to the first terminal holding part 74 of the first terminal-holding piece 70. When the first terminal holding piece 70 and the second terminal holding piece 72 are elastically deformed about the curved part 64 side in a direction (arrow E1 direction and arrow E2 direction in FIG. 5) in which the first end 76 and the second end 80 approach to each other, the first terminal holding part 74 and the second terminal holding part 78 are moved so as to separate from each other (that is, in a direction toward the arrow F1 side and in a direction toward the arrow F2 side in FIG. 5).

Thus, by separating the first terminal holding part 74 and the second terminal holding part 78 from each other, the part of the tube 38 covering the both terminals 34 and 36 can be arranged between the first terminal holding part 74 and the second terminal holding part 78. When the load in the direction of bringing the first end 76 and the second end 80 close to each other is released from this state, the part of the tube 38 covering the both terminals 34 and 36 is held in the first terminal holding part 74 and the second terminal holding part 78 by the elasticity of the first terminal holding piece 70 and the second terminal holding piece 72 at the second pressure contact part 68.

In this state, the plate 24 and the heater 26 are arranged between the first pressure contact part 66 and the first terminal holding part 74 of the second pressure contact part 68. The first pressure contact part 66 and the second terminal holding part 78 of the second pressure contact part 68 are separated (that is, they are moved to an arrow G1 direction side and an arrow G2 direction side in FIG. 5). In this state, the curved part 64 is elastically deformed, and the elasticity of the curved part 64 biases the first pressure contact part 66 and the second pressure contact part 68 so as to bring the first pressure contact part 66 and the second pressure contact part 68 close to each other. The bus bar 62 is attached to the plate 24 and the heater 26 in such a manner that the first pressure contact part 66 and the second pressure contact part 68 sandwich the plate 24 and the heater 26.

In such configuration, by assembling the resistance member 32 covered with the tube 38 to the bus bar 62 in advance, the resistance member 32 can be assembled to the plate 24 and the heater 26 together with the bus bar 62. This makes it possible to reduce the number of assembling process.

Since the bus bar 62 holds the resistance member 32, it is not required to provide the camera bracket 14 or the housing 12 with a structure for holding the resistance member 32, and it becomes possible to simplify the camera bracket 14 and the housing 12.

Since the resistance member 32 is held by the bus bar 62, the resistance member 32 is stabilized, and occurrence of a defect caused by inadvertent motion of the resistance member 32 can be suppressed.

In each of the embodiments, the heat transfer suppression units includes the tube 38. However, a configuration may be adopted in which a partition wall as a heat transfer suppression unit is provided between the arrangement position of the camera bracket 14 and the arrangement position of the resistance member 32 inside the housing 12, for example, and this partition wall suppresses the heat of the heater 26 from transferring to the resistance member 32. That is, the heat transfer suppression unit is not limited to a specific aspect as long as the heat of the heater 26 can be suppressed from transferring to the resistance member 32.

In each of the embodiments, the heat transfer suppression unit such as the tube 38 suppresses the heat of the heater 26 from transferring to the resistance member 32. However, a configuration in which the heat transfer suppression unit such as the tube 38 is not provided may be adopted as long as the resistance member 32 is arranged sufficiently away from the heater 26 and the resistance member 32 is not affected (or hardly affected) by the heat of the heater 26, for example.

In the second embodiment, the arrangement position of the resistance member 32 is at the camera bracket 14, and in the third embodiment, the arrangement position of the resistance member 32 is at the plate 24. However, the arrangement position of the resistance member 32 may be a position away from the camera bracket 14 or the plate 24 inside the housing 12, or may be outer side of the housing 12.

Although the resistance member 32 is configured to generate heat by being energized, heat generated by the resistance member 32 is not particularly mentioned in each of the embodiments. For example, a configuration may be adopted in which the resistance member 32 is provided near a transition part between the housing 12 and the vehicle body to which the housing 12 is attached, and the housing 12 and an area close to the transition part of the vehicle body is warmed by the heat generated by energization of the resistance member 32. In such configuration, heat generated by energization of the resistance member 32 can suppress moisture or the like entering the gap in winter from being frozen, for example, and rotation of the housing 12 can be maintained.

In each of the embodiments, a configuration in which the tube 38 as the heat transfer suppression unit is provided is adopted. However, a configuration may be adopted in which the heat transfer suppression unit is not provided, as long as the heat of the heater 26 does not affect the resistance member 32 or the heat of the heater 26 affects the resistance member 32 little.

In each of the embodiments, the "imaging side" at which the camera 16 performs imaging is the vehicle rear side. However, the "imaging side" at which the camera 16 performs imaging may be the outer side in the vehicle width direction of the vehicle (left side or right side of the vehicle), the upper side of the vehicle, the lower side of the vehicle, or the front side of the vehicle.

In each of the embodiments, the vehicle imaging apparatus 10 is configured to be provided at the side door panel of the vehicle and images the vehicle rear side. However, the vehicle imaging apparatus 10 may be a so-called "front camera", which is provided at a front part of a vehicle such as a front grille and images the vehicle front side or the like, or may be a so-called "rear camera", which is provided at a rear part of the vehicle and images the vehicle rear side or the like. In each of the embodiments, the camera 16 is configured to be arranged at an outer side of the vehicle is adopted. However, the camera 16 may be arranged at an inner side of the vehicle. That is, the arrangement position of the vehicle imaging apparatus 10 is not particularly limited, and can be widely applied.

In each of the embodiments, the heater 26 is provided at the plate 24. However, the heater 26 may be provided at the lens 20 of the camera 16. In the case of such configuration in which the heater 26 is provided at the lens 20 of the camera 16, the plate 24 may not to be provided.

In each of the embodiments, the heater 26 is provided at the imaging side (for example, the arrow A direction side in FIG. 1) of the plate 24. However, the heater 26 may be provided at the opposite side to the imaging side in the plate 24 (for example, the opposite side to the direction of the arrow A in FIG. 1) or at the opposite side to the imaging side in the lens 20.

In each of the embodiments, the outer peripheral shape of the heater 26 is a substantially rectangular shape that is the same as the outer peripheral shape of the plate 24 or larger than the outer peripheral shape of the plate 24. However, the outer peripheral shape of the heater 26 may be smaller than the outer peripheral shape of the plate 24. In a case in which the outer peripheral shape of the heater 26 is smaller than the outer peripheral shape of the plate 24, it is desirable that the arrangement position of the heater 26 is set in such a manner that the heater 26 is at the central area within the angle of view of the camera 16.

The invention claimed is:

1. A vehicle imaging apparatus comprising:
an imaging device capable of imaging an imaging side thereof;
a transparent heater provided at least in a range of an angle of view of the imaging device at the imaging side of the imaging device, generating heat by being energized, and heating the imaging side of the imaging device; and
a resistance member provided at an electrical circuit that includes the heater, and generating heat by being energized, an electrical resistance value of the resistance member being increased along with increase in temperature of the resistance member due to the heat generation such that a current value of current that flows to the heater is decreased,
wherein the resistance member is separate from a transparent plate, and the transparent heater is disposed at the transparent plate.

2. The vehicle imaging apparatus according to claim 1, wherein:
the imaging device comprises:
an imaging device main body provided with a lens on the imaging side, and
the transparent plate provided on the imaging side of the imaging device main body; and the heater is provided on the imaging side or on a side opposite from the imaging side at at least one of the plate or the lens.

3. The vehicle imaging apparatus according to claim 1, wherein, in a state in which the resistance member is at a specific temperature, a temperature of the heater is lower than the specific temperature.

4. The vehicle imaging apparatus according to claim 1, wherein an increase in the electrical resistance value of the resistance member accompanying a temperature increase of the resistance member is larger at a predetermined temperature or higher, than at a temperature lower than the predetermined temperature.

5. The vehicle imaging apparatus according to claim 1, further comprising a heat transfer suppression unit that suppresses heat from an exterior of the resistance member from transferring to the resistance member.

6. The vehicle imaging apparatus according to claim 5, wherein the heat transfer suppression unit has the resistance member arranged at an inner side of the heat transfer suppression unit and covers the resistance member.

7. A vehicle imaging apparatus comprising:

an imaging device capable of imaging an imaging side thereof;

a transparent heater provided at least in a range of an angle of view of the imaging device at the imaging side of the imaging device, generating heat by being energized, and heating the imaging side of the imaging device; and a resistance member provided at an electrical circuit that includes the heater, and generating heat by being energized, an electrical resistance value of the resistance member being increased along with increase in temperature of the resistance member due to the heat generation such that a current value of current that flows to the heater is decreased, wherein, in a state in which the resistance member is at a specific temperature, a temperature of the heater is lower than the specific temperature.

* * * * *